(12) United States Patent
Kang

(10) Patent No.: US 10,083,164 B2
(45) Date of Patent: Sep. 25, 2018

(54) ADDING ROWS AND COLUMNS TO A SPREADSHEET USING ADDITION ICONS

(71) Applicant: Samsung Electronics Co., Ltd., Suwon-si, Gyeonggi-do (KR)

(72) Inventor: Young-cheol Kang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 14/202,503

(22) Filed: Mar. 10, 2014

(65) Prior Publication Data

US 2014/0359419 A1    Dec. 4, 2014

(30) Foreign Application Priority Data

Jun. 3, 2013 (KR) .......................... 10-2013-0063648

(51) Int. Cl.
*G06F 17/24* (2006.01)

(52) U.S. Cl.
CPC .......... *G06F 17/245* (2013.01); *G06F 17/246* (2013.01); *G06F 17/247* (2013.01)

(58) Field of Classification Search
CPC ............... G06F 3/0485; G06F 3/04847; G06F 17/245–17/247
See application file for complete search history.

(56) References Cited

U.S. PATENT DOCUMENTS

| 6,246,395 | B1 * | 6/2001 | Goyins | G06F 3/0488 345/173 |
| 8,856,670 | B1 * | 10/2014 | Thakur | G06F 9/4443 715/747 |
| 2002/0129125 | A1 * | 9/2002 | Avital | G06F 3/14 709/219 |
| 2009/0244003 | A1 * | 10/2009 | Bonnat | G06F 3/011 345/157 |
| 2010/0299587 | A1 * | 11/2010 | Swett | G06F 17/245 715/227 |

OTHER PUBLICATIONS

Microsoft Excel, Copyright 2010, all pages. Add rows, and columns screendumps, Sum function screendumps.*
Microsoft Word, Copyright 2010, all pages., Sum function screendumps.*
Thinkwise, Simtech Systems Copyright 2011, all pages. http://m.thinkwise.co.kr/Manual/manual1.asp.*
TheElderGreek NPL captured Oct. 13, 2011, https://web.archive.org/web/20111013110200/http://www.theeldergeek.com/prevent_duplicate_icon.htm.*

* cited by examiner

*Primary Examiner* — Cesar B Paula
*Assistant Examiner* — Benjamin J Norris
(74) *Attorney, Agent, or Firm* — Jefferson IP Law, LLP

(57) ABSTRACT

An electronic apparatus and a method for creating a document using the same are provided. A method for creating a document using an electronic apparatus includes displaying at least one addition icon in a or around a text box when a text box generating command is input, and adding a cell to the text box and converting the text box into a table when one of the at least one addition icon is selected. Accordingly, the user may easily convert a text box into a table when creating a document.

21 Claims, 16 Drawing Sheets

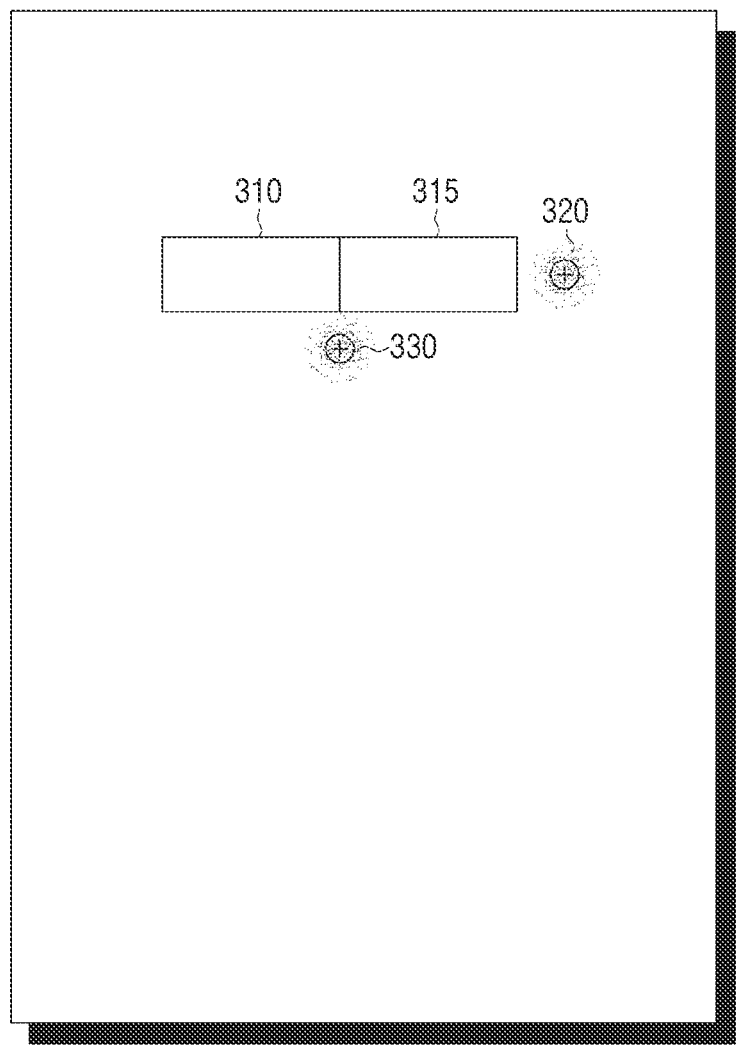

ADDING ROWS AND COLUMNS TO A SPREADSHEET USING ADDITION ICONS

CROSS-REFERENCE TO RELATED APPLICATION(S)

This application claims the benefit under 35 U.S.C. § 119(a) of a Korean patent application filed on Jun. 3, 2013 in the Korean Intellectual Property Office and assigned Serial No. 10-2013-0063648, the entire disclosure of which is hereby incorporated by reference.

TECHNICAL FIELD

The present disclosure relates to an electronic apparatus, and a method for creating a document using the same. More particularly, the present disclosure relates to an electronic apparatus capable of creating a document using a word processing program, and a method for creating a document using the same.

BACKGROUND

When inputting text using a text box of a word processing program (e.g., a word processor), there is a need for changing (e.g., converting) the text box into a table in order to insert various content or text in the text box.

However, in current word processing programs, in order to change a text box into a table when inputting text using the text box, a table has to be generated and the text input to the text box has to be copied to the table.

Accordingly, for the change, the user has to repeat input manipulations, and there is a risk of deleting text during the copying process. In addition, there is a risk of inadvertently missing some text.

In addition, in a recent electronic apparatus capable of performing word processing using a touch screen, a lot of time and trouble is required to newly generate a table and copy text in a text box to the table.

Therefore, there is a need for a method for easily converting a text box into a table.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus which provides an icon to convert a text box into a table by adding a cell around the text box so as to easily convert the text box into the table, and a method for creating a document using the same.

Another aspect of the present disclosure is to provide an electronic apparatus which provides various icons to easily edit a table, and a method for creating a document using the same.

In accordance with an aspect of the present disclosure, a method for creating a document using an electronic apparatus is provided. The method includes when a text box generating command is input, displaying at least one addition icon in or around a text box, and when one of the at least one addition icon is selected, adding a cell to the text box and converting the text box into a table.

In accordance with an aspect of the present disclosure, the displaying of at least one addition icon may include displaying two addition icons such that an addition icon is displayed to the right of the text box and another addition icon is displayed below the text box.

In accordance with an aspect of the present disclosure, the converting of the text box into the table may include, when the addition icon displayed to the right of the text box is selected, adding the cell to the right of the text box and converting the text box into the table, and when the addition icon displayed below the text box is selected, adding the cell below the text box and converting the text box into the table.

In accordance with an aspect of the present disclosure, the converting of the text box into the table may include displaying two addition icons such that an addition icon is displayed to the right of the table and another addition icon is displayed below the table.

In accordance with an aspect of the present disclosure, when the addition icon displayed to the right of the table is selected, a new column may be added to the table, and when the addition icon displayed below the table is selected, a new row may be added to the table.

In accordance with an aspect of the present disclosure, the method may further include when the table includes a plurality of rows and a plurality of columns, and one of a plurality of cells in the table is selected, displaying an insertion icon in at least one of up and down and left and right directions of the selected cell, and when one of the at least one insertion icon is selected, inserting a row or a column in direction corresponding to the selected insertion icon on the basis of the selected cell.

In accordance with an aspect of the present disclosure, the method may further include when the table includes a plurality of rows and a plurality of columns, and a predetermined user command is input to one of a plurality of cells in the table, displaying a deletion icon in at least one of up and down and left and right directions of a cell to which the predetermined user command is input, and when one of the at least one deletion icon is selected, deleting a row or a column in direction corresponding to the selected deletion icon on the basis of a cell to which the predetermined user command is input.

In accordance with an aspect of the present disclosure, the displaying of the deletion icon may include displaying a drag icon around the deletion icon, the deleting of the row or the column may include, when a deletion range is set using the drag icon and one of the at least one deletion icon is selected, deleting a plurality of rows or columns included in the deletion range on the basis of a cell to which the predetermined user command is input.

In accordance with an aspect of the present disclosure, when figures are input to a plurality of cells in the table, the table may provide arithmetic function for the figures in the plurality of cells.

The electronic apparatus may receive a user command through a touch screen.

In accordance with another aspect of the present disclosure, an electronic apparatus is provided. The electronic apparatus includes a display, an inputter configured to receive a user command, and a controller configured to control the display to display at least one addition icon or around a text box when a text box generating command is input through the inputter, and to add a cell to the text box and convert the text box into a table when one of the at least one addition icon is selected through the inputter.

In accordance with an aspect of the present disclosure, the controller may control the display to display two addition icons such that an addition icon is displayed to the right of the text box and another addition icon is displayed below the text box.

In accordance with an aspect of the present disclosure, when the addition icon displayed to the right of the text box is selected, the controller may add the cell to the right of the text box, and convert the text box into the table, and when the addition icon displayed below the text box is selected, the controller may add the cell below the text box, and convert the text box into the table.

In accordance with an aspect of the present disclosure, the controller may control the display to display two addition icons such that an addition icon is displayed to the right of the table and another addition icon is displayed below the table.

In accordance with an aspect of the present disclosure, when the addition icon displayed to the right of the table is selected, the controller may add a new column to the table, and when the addition icon displayed below the table is selected, the controller may add a new row to the table.

In accordance with an aspect of the present disclosure, when the table includes a plurality of rows and a plurality of columns, and one of a plurality of cells in the table is selected, the controller may control the display to display an insertion icon in at least one of up and down and left and right directions of the selected cell, and when one of the at least one insertion icon is selected through the inputter, the controller may insert a row or a column in direction corresponding to the selected insertion icon on the basis of the selected cell.

In accordance with an aspect of the present disclosure, when the table includes a plurality of rows and a plurality of columns, and a predetermined user command is input to one of a plurality of cells in the table, the controller may control the display to display a deletion icon in at least one of up and down and left and right directions of a cell to which the predetermined user command is input, and when one of the at least one deletion icon is selected, the controller may delete a row or a column in direction corresponding to the selected deletion icon on the basis of a cell to which the predetermined user command is input.

In accordance with an aspect of the present disclosure, the controller may control the display to display a drag icon around the deletion icon, and when a deletion range is set using the drag icon and one of the at least one deletion icon is selected, the controller may delete a plurality of rows or columns included in the deletion range on the basis of a cell to which the predetermined user command is input.

In accordance with an aspect of the present disclosure, when figures are input to a plurality of cells in the table, the table may provide arithmetic function for the figures in the plurality of cells.

In accordance with an aspect of the present disclosure, the inputter may be a touch screen.

In accordance with another aspect of the present disclosure, a method for creating a document using an electronic apparatus is provided. The method includes when a table generating command is input, displaying at least one addition icon in or around a table, and when one of the at least one addition icon is selected, adding a column or a row in direction corresponding to the selected addition icon.

In accordance with another aspect of the present disclosure, an electronic apparatus is provided. The electronic apparatus includes a display, an inputter configured to receive a user command, and a controller configured to control the display to display at least one addition icon in or around a table when a table generating command is input through the inputter, and to add a column or a row in direction corresponding to a selected addition icon when one of the at least one addition icon is selected through the inputter.

According to various embodiments of the present disclosure, the user may easily convert a text box into a table when creating a document. In addition, the user may easily edit a table in a touch screen environment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments the present disclosure will be more apparent from the following description taken in conjunction with the accompanying drawings, in which:

FIGS. 3A and 3B illustrate a method for converting a text box into a table according to an embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

Figure 1:
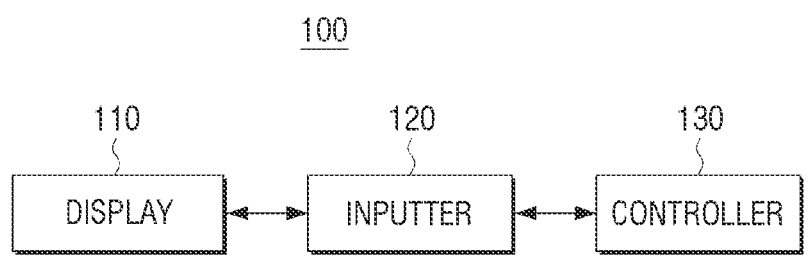
FIG. 1 is a schematic block diagram of a configuration of an electronic apparatus according to an embodiment of the present disclosure.

FIG. 1 is a schematic block diagram of a configuration of an electronic apparatus according to an embodiment of the present disclosure.

Referring to FIG. 1, the electronic apparatus 100 may include a display 110, an inputter 120, and a controller 130.

According to various embodiments of the present disclosure, the electronic apparatus 100 may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of word processing.

The display 110 displays various image data according to control of the controller 130. In particular, when a text box generating command is input during word processing, the display 110 may display at least one addition icon in the text box or around the text box. In addition, the display 110 may display an insertion icon and a deletion icon to edit a table.

The inputter 120 receives a user command to control the electronic apparatus 100. In particular, the inputter 120 may receive various user commands such as a text box generating command, a table generating command, and an icon selecting command.

According to various embodiments of the present disclosure, the inputter 120 may be implemented with a touch panel capable of detecting a touch input. The inputter 120 may be implemented with various input apparatuses such as a mouse, a pointing device, a motion inputter, and/or the like.

The controller 130 may control the overall operation of the electronic apparatus 100 according to a user command which is input through the inputter 120. In particular, when a text box generating command is input through the inputter 120 while creating a document using a word processing program (e.g., a word processor, Hunminjeongeum, Hangul, or the like), the controller 130 may control the display 110 to display at least one addition icon in a text box or around a text box. The text box is a document tool that includes a single cell in which text and/or the like may be input.

As an example, the controller 130 may control the display 110 to display two addition icons to the right of the text box and below the text box. The controller 130 may control the display 110 to further display at least one addition icon around the text box as well as the two addition icons. For example, the controller 130 may control the display 110 to display four addition icons above and below the text box and to the right and left of the text box.

When one of the at least one addition icons is selected through the inputter 120, the controller 130 may add a cell to the text box and convert the text box into a table.

For example, when an addition icon displayed to the right of the text box is selected through the inputter 120, the controller 130 may add a cell to the right side of the text box and convert the text box into a table. As another example, when an addition icon displayed below the text box is selected, the controller 130 may add a cell below the text box and convert the text box into a table. The table is a document tool that includes at least one single cell in which text, a figure, and/or the like is input.

At this time, the controller 130 does not only add the cell to the text box but also changes a document tool property from a text box property to a table property. More specifically, when a figure is input to a text box, the controller 130 recognizes the figure as text. However, when a figure is input to a table, the controller 130 recognizes the figure as a figure. Accordingly, when figures are input to a plurality of cells in a table, the controller 130 may provide functions associated with figures. For example, when figures are input to a table, the controller 130 may enable a user to perform or otherwise insert arithmetic functions. In other words, when a text box is converted into a table, the user can perform various arithmetic functions using figures in the text box.

According to various embodiments of the present disclosure, when a table is displayed, the controller 130 may control the display 110 to display two addition icons to the right of the table and/or below the table. The controller 130 may control the display 110 to further display at least one addition icon around the table as well as the two addition icons. For example, the controller 130 may control the display 110 to display four addition icons above and below the table and to the right and left of the table.

According to various embodiments of the present disclosure, when one of the at least one addition icons is selected on the table, the controller 130 may add a column or a row to the table in the direction corresponding to the selected addition icon. For example, when an addition icon displayed to the right of the table is selected, the controller 130 may add a new column to the table. As an example, the new column may be inserted to the right of the previously displayed columns to the table. As another example, the new column may be inserted to the right of the currently selected (e.g., highlighted, touched, or the like) field (e.g., cell) of the table (e.g., so as to be immediately adjacent and to the right of the currently selected field of the table). In addition, when an addition icon displayed below the table is selected, the controller 130 may add a new row to the table.

According to various embodiments of the present disclosure, when a table includes a plurality of rows and a plurality of columns and one of the plurality of cells in the table is selected, the controller 130 may control the display 110 to display an insertion icon in at least one of the up and down and left and right directions of the selected cell. More specifically, when a table includes a plurality of rows and a plurality of columns, and one of the plurality of cells of the table is highlighted, the controller 130 may control the display 110 to display insertion icons in the up and down and left and right direction of the highlighted cell.

According to various embodiments of the present disclosure, when one of the at least one insertion icons is selected, the controller 130 may insert a row or a column in the direction corresponding to the selected insertion icon on the basis of the selected cell. For example, when an insertion icon displayed in the right direction is selected from among the insertion icons displayed in the up and down and left and right direction of the highlighted cell, the controller 130 may insert a new column to the right of the highlighted cell.

According to various embodiments of the present disclosure, when a table includes a plurality of rows and a plurality of columns and a predetermined user command is input to one of the plurality of cells of the table through the inputter 120, the controller 130 may control the display 110 to display a deletion icon in at least one of up and down and right and left directions of the cell. For example, when a user command of touching one of the plurality of cells more than a predetermined period of time is input, the controller 130 may control the display 110 to display two deletion icons in the up and left directions of the touched cell. At this time, the controller 130 may control the display 110 to highlight a column and a row including the touched cell.

According to various embodiments of the present disclosure, when one of the at least one deletion icon is selected, the controller 130 may delete a row or a column of the direction corresponding to the selected deletion icon on the basis of the touched cell. For example, when a deletion icon displayed above the touched cell is selected from among the two deletion icons displayed to the left of the touched cell and above the touched cell, the controller 130 may delete a column including the touched cell.

In addition, the controller 130 may display a drag icon around the deletion icon to set a deletion range. When one of the at least one deletion icon is selected after a deletion range is set using the drag icon, the controller 130 may delete a plurality of rows or columns included in the deletion range on the basis of the touched cell.

Using the electronic apparatus 100 as described above, the user may easily and conveniently convert a text box into a table. In addition, the user may edit cells in the table conveniently without the use of a menu window.

The electronic apparatus is described below in greater detail with reference to FIGS. 2 to 6E.

Figure 2:
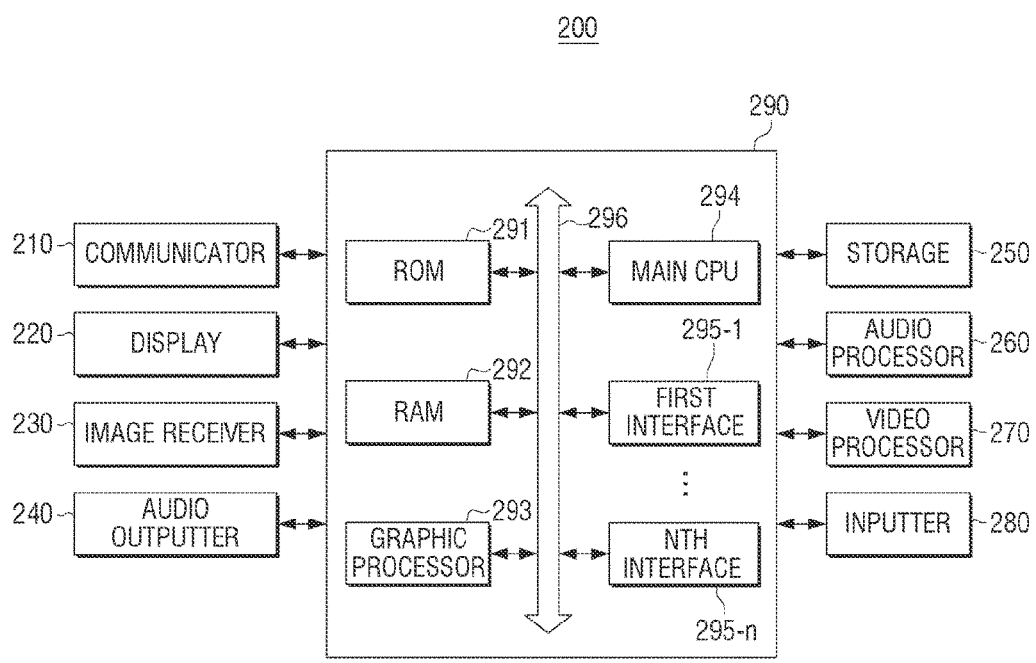
FIG. 2 is a detailed block diagram of a configuration of an electronic apparatus according to an embodiment of the present disclosure.

FIG. 2 is a detailed block diagram of a configuration of an electronic apparatus according to an embodiment of the present disclosure.

Referring to FIG. 2, the electronic apparatus 200 may include a communicator 210, a display 220, an image receiver 230, an audio outputter 240, a storage 250, an audio processor 260, a video processor 270, an inputter 280, and a controller 290.

Referring to FIG. 2, a device including various functions such as word processing function, communication function, video playback function, display function, and so on are described an example of the electronic apparatus 200, and the components of the electronic apparatus 200 are shown. Therefore, according to various embodiments of the present disclosure, a part of the components shown in FIG. 2 may be omitted or changed, and other components may be added.

According to various embodiments of the present disclosure, the communicator 210 communicates with various types of external devices according to various types of communication methods. In particular, the communicator 210 may include various types of communication chips such as a Wi-Fi chip, a Bluetooth chip, a Near Field Communication (NFC) chip, a wireless communication chip, and/or the like. The Wi-Fi chip, the Bluetooth chip, and the NFC chip perform communication in Wi-Fi method, Bluetooth method, and NFC method, respectively. For example, the NFC chip is a chip that operates in the NFC method which uses a 13.56 MHz band from among various Radio Frequency Identification (RFID) frequency bands such as 135 kHz, 13.56 MHz, 433 MHz, 860-960 MHz, and 2.45 GHz. Using the Wi-Fi chip or the Bluetooth chip, various connection information such as a Subsystem Identification (SSID) and a session key are transmitted and received first, and then when communication is connected, various information can be transmitted and received. The wireless communication chip is a chip that performs communication according to various communication standards such as Institute of Electrical and Electronics Engineers (IEEE), Zigbee, $3^{rd}$ Generation (3G), $3^{rd}$ Generation Partnership Project (3GPP), and Long Term Evolution (LTE).

According to various embodiments of the present disclosure, the display 220 displays at least one of a video frame processed by the video processor 270 from among an image data received through the image receiver 230, and at least one of various screens generated by the graphic processor 293. In particular, when a text box generating command is input while creating a document using a word processing program, the display 220 may display a text box and an addition icon around the text box. In addition, the display 220 may display at least one of an addition icon, an insertion icon, and a deletion icon to edit a table while creating a document using the table.

According to various embodiments of the present disclosure, the image receiver 230 receives image data from various types of sources. For example, the image receiver 230 may receive broadcast data from an external broadcast station and receive image data from an external device (e.g., a Digital Versatile Disk (DVD) player).

According to various embodiments of the present disclosure, the audio outputter 240 outputs various alarm sounds or voice messages as well as various audio data processed by the audio processor 260.

According to various embodiments of the present disclosure, the storage 250 stores various modules to drive the electronic apparatus 200. For example, the storage 250 may store software including a base module, a sensing module, a communication module, a presentation module, a web browser module, and a service module. The base module is a basic module which processes a signal transmitted from hardware included in the electronic apparatus 200 and transmits the signal to an upper layer module. The sensing module is a module which collects information from various sensors and analyzes and manages the collected information. The sensing module may include a face recognition module, a voice recognition module, a motion recognition module, a NFC recognition module, and/or the like. The presentation module is a module which composes a display screen, and may include a multimedia module to play back and output multimedia content and a User Interface (UI) rendering module to perform processing of UI and graphic. The communication module is a module which communicates with external devices. The web browser module is a module which performs web browsing and accesses a web server. The service module is a module which includes various applications to provide various services.

In addition, the storage 250 may store at least one word processing program. For example, the storage 250 may store word processor program, Hangul program, Hunminjeongeum program, and/or the like.

According to various embodiments of the present disclosure, the storage 250 may include various program modules as described above, but a part of the various program modules may be omitted or changed according to the type and property of the electronic apparatus 200, and other program modules may be added. For example, if the electronic apparatus 200 is a portable device (e.g., a tablet PC, a cell phone, or the like), the base module may further include a position determination module to determine a position based on a Global Positioning System (GPS), and the sensing module may further include a sensing module to detect the user's gesture.

According to various embodiments of the present disclosure, the audio processor 260 processes audio data. The audio processor 260 performs various operations such as decoding, amplification, noise filtering of audio data. The audio data processed by the audio processor 260 is output to the audio outputter 240.

According to various embodiments of the present disclosure, the video processor 270 processes image data received through the image receiver 230. The video processor 270 performs various image processing such as decoding, scaling, noise filtering, frame rate conversion, and resolution conversion of image data.

According to various embodiments of the present disclosure, the inputter 280 receives a user command to control the overall operation of the electronic apparatus 200. The inputter 280 may receive various user commands such as a text box generating command, a table generating command, an icon selecting command, and/or the like. The inputter 280 may be implemented with a touch panel, but this is merely an embodiment. The inputter 280 may be implemented with various input devices such as a mouse, a pointing device, a motion input device, and/or the like.

According to various embodiments of the present disclosure, the controller 290 controls the overall operation of the electronic apparatus 200 using various kinds of programs stored in the storage 250.

Referring to FIG. 2, the controller 290 may include a a Read-Only Memory (ROM) 291, a Random-Access Memory (RAM) 292, a graphic processor 293, a main Central Processing Unit (CPU) 294, first to $N^{th}$ interfaces 295-1 to 295-N, and a bus 296. The ROM 291, the RAM 292, the graphic processor 293, the main CPU 294, and the first to $N^{th}$ interfaces 295-1 to 295-N may be connected to one another via the bus 296.

The ROM 291 stores a set of commands for booting up the system. When a turn-on command is input and the power is supplied, the main CPU 294 copies an Operating System (OS) stored in the storage 250 to the RAM 292 and executes the OS according to the commands stored in the ROM 291 so that the system can boot up. When the boot-up is complete, the main CPU 294 copies various application programs stored in the storage 250 to the RAM 292 and executes the copied application programs so that various operations can be performed.

The graphic processor 293 generates a screen including various objects such as an icon, an image, and text, using an operator (not shown) and a renderer (not shown). The operator operates property values of each object, such as a coordinate value, shape, size and color, according to layout of the screen using a control command received from the inputter 280. The renderer generates a screen having various layout including the objects based on the property values operated by the operator. The screen generated by the renderer is displayed on a display area of the display 220. In particular, the graphic processor 293 may generate a UI which includes feed included in video.

The main CPU 294 accesses the storage 250 and boots up the system using the OS stored in the storage 250. In addition, the main CPU 294 performs various operations using various programs, contents, and data stored in the storage 250.

The first to $N^{th}$ interfaces 295-1 to 295-N are connected to the aforementioned components. One of the interfaces may be a network interface that is connected to an external device through a network.

Figure 3A:
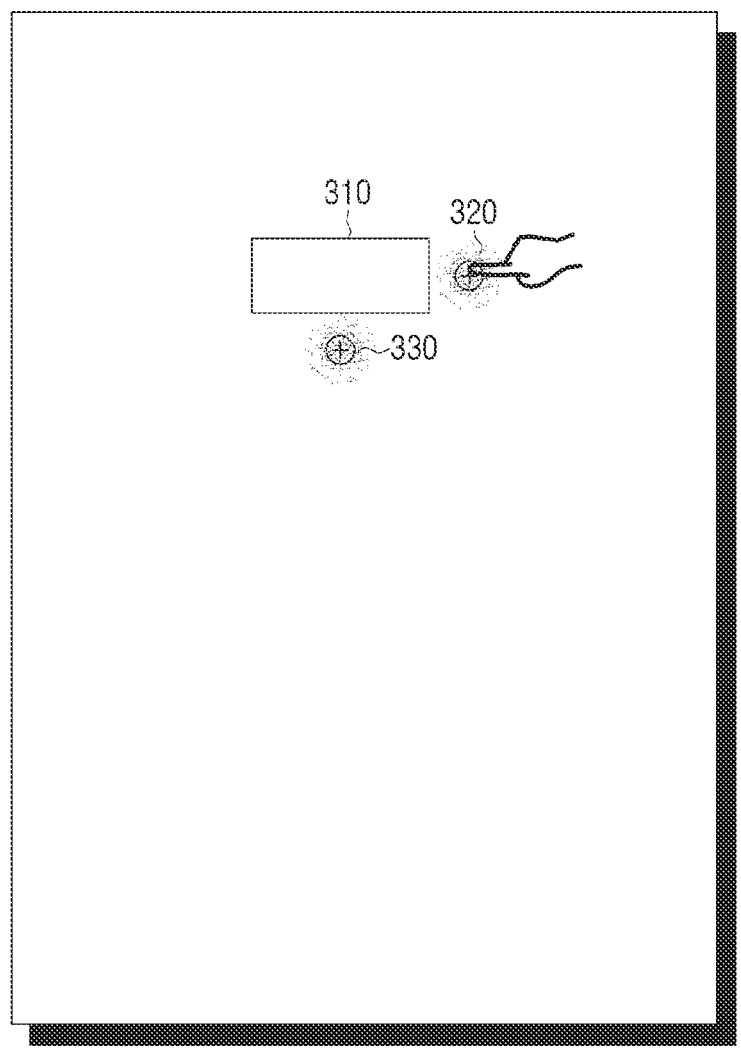

FIGS. 3A and 3B illustrate a method for converting a text box into a table according to an embodiment of the present disclosure.

Referring to FIGS. 3A and 3B, when a text box generating command is input through the inputter 280 while creating a document using a word processing program, the controller 290 may control the display 220 to display at least one addition icon in the text box or around the text box. For example, as illustrated in FIG. 3A, when an icon to generate a text box is selected from among tool icons to select a tool of a word processing program while creating a document using the word processing program, the controller 290 may control the display 220 to display a text box 310 and display two addition icons 320 and 330 to the right of the text box 310 and below the text box 310. The text box 310 is a document tool that consists of a single cell to input text. Text and figures input in the text box 310 are recognized as text.

In addition, when one of the at least addition icons is selected through the inputter 280, the controller 290 may add a cell to the text box 310 and convert the text box 310 and the cell into a table. For example, as illustrated in FIGS. 3A and 3B, when the two addition icons 320 and 330 are displayed to the right of the text box 310 and below the text box 310, and the addition icon 320 on the right of the text box 310 is selected, the controller 130 may add a cell 315 to the right of the text box 310 and convert the text box 310 into a table including two cells as illustrated in FIG. 3B. At this time, the controller 290 may not only add the cell 315 to the text box 310 but may also change properties of the text box 310 into properties of a table. In the table, when text is input, the controller 290 may recognize the input text as text, but when a figure is input, the controller 290 may recognize the input figure as a figure. Accordingly, because properties of the text box 310 changes into properties of the table, the electronic apparatus 200 may provide the user with a function, which is provided only in table properties, for operating figures included in a plurality of cells.

According to various embodiments of the present disclosure, the addition icon 320 on the right of the text box 310 is selected. When the addition icon 330 below the text box 310 is selected, the controller 290 may add a cell below the text box 310 and convert the text box 310 into a table.

Figure 4A:
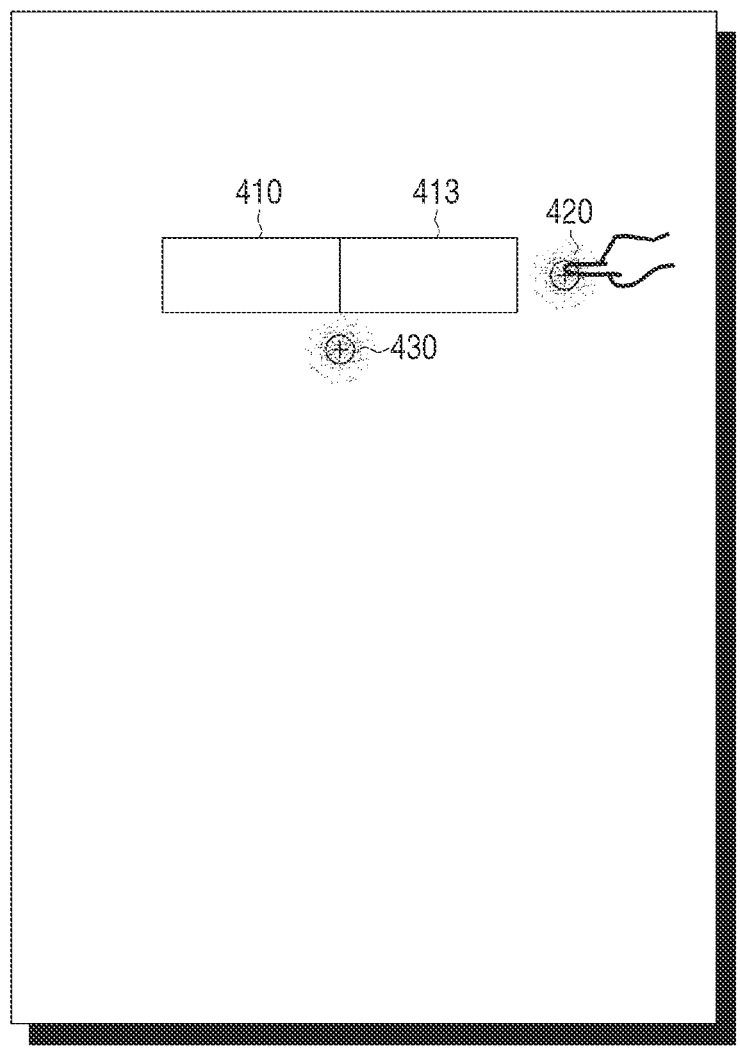
FIGS. 4A, 4B, and 4C illustrate a method for expanding a table according to an embodiment of the present disclosure.
Figure 4B:
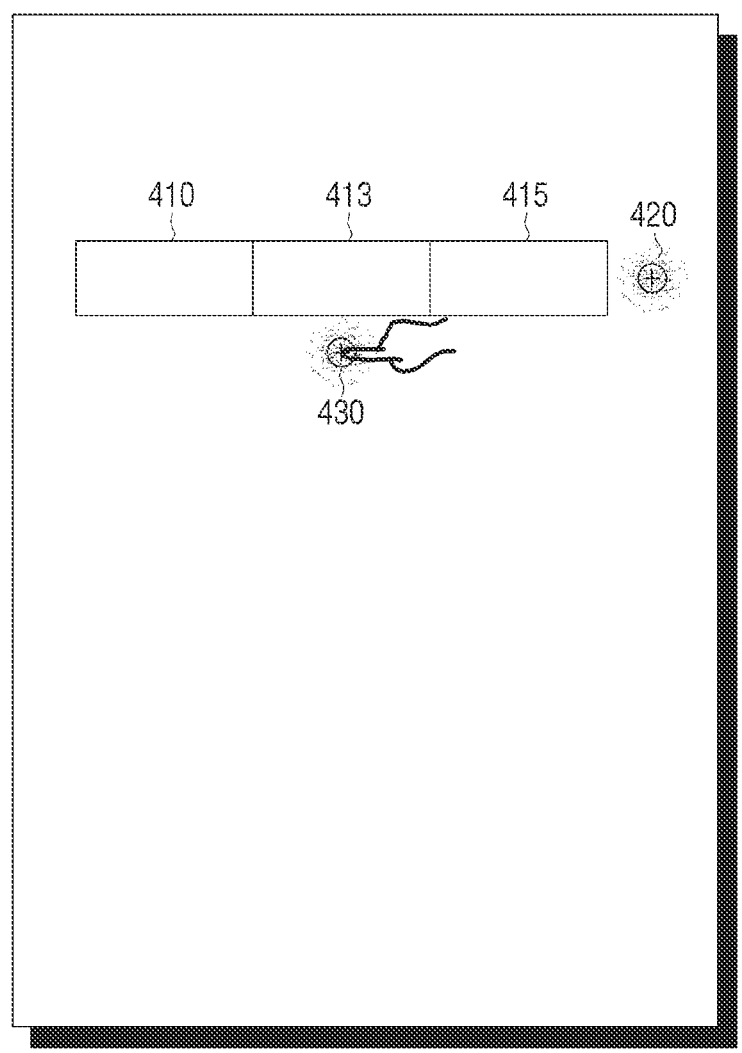
Figure 4C:
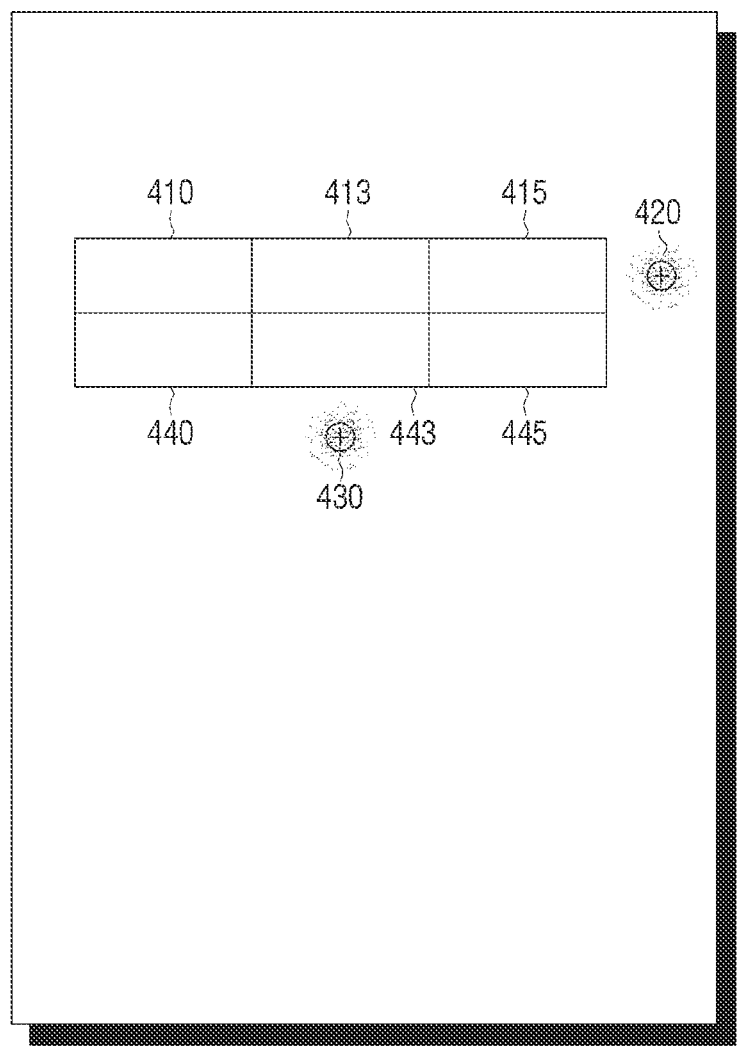

FIGS. 4A, 4B, and 4C illustrate a method for expanding a table according to an embodiment of the present disclosure.

Referring to FIGS. 4A, 4B, and 4C, even after the text box is converted into the table, the controller 290 may control the display 220 to continually display at least one addition icon around the table. For example, as illustrated in FIG. 4A, when a table including two cells 410 and 413 is displayed, the controller 290 may control the display 220 to display two addition icons 420 and 430 to the right of the table and below the table.

When one of the at least one addition icon is selected on the table, the controller 290 may add a column or a cell on the table to correspond to the selected addition icon. For example, as illustrated in FIGS. 4A and 4B, when the two cells 410 and 413 are displayed and the addition icon 420 on the right of the table is selected, the controller 290 may control the display 220 to add a new column to the right of the table and display one more cell 415. As another example, as illustrated in FIGS. 4B, and 4C, when the three cells 410, 413, and 415 are displayed and the addition icon 430 below the table is selected, the controller 290 may control the display 220 to add a new row and display three more cells 440, 443, and 445 as shown in FIG. 4C.

Figure 5A:
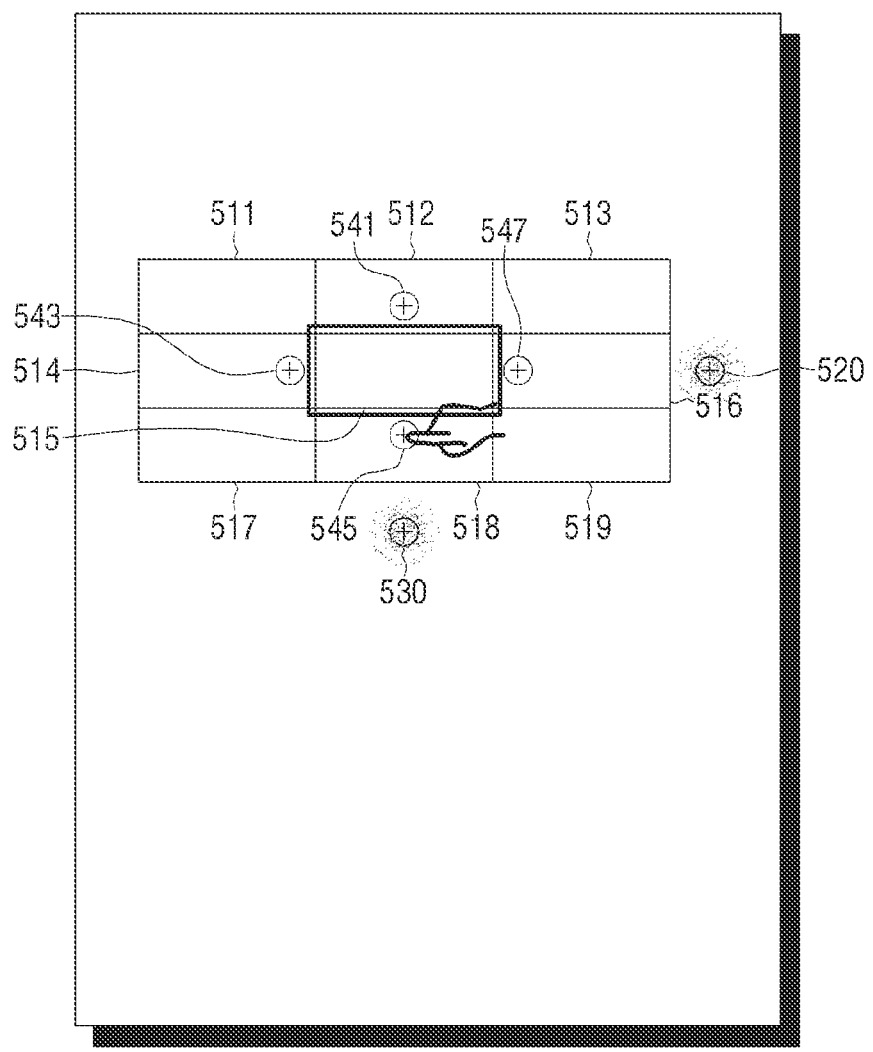
FIGS. 5A and 5B illustrate a method for inserting a cell into a table according to an embodiment of the present disclosure.
Figure 5B:
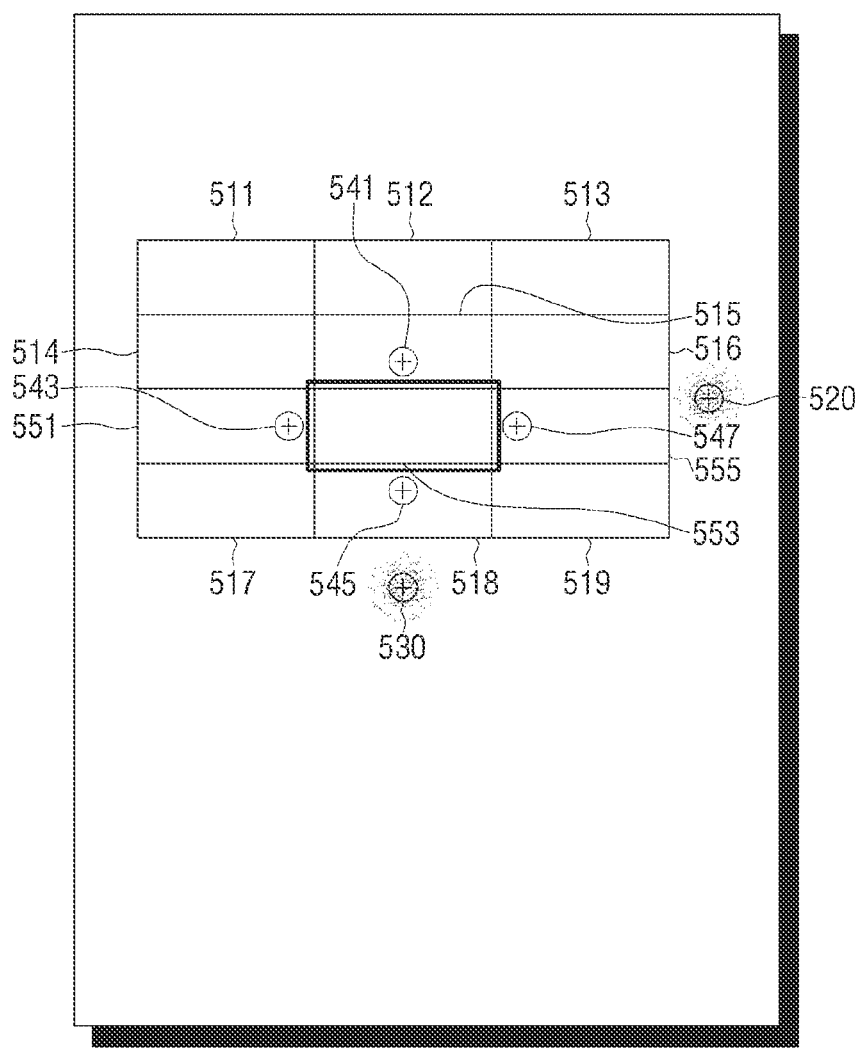

FIGS. 5A and 5B illustrate a method for inserting a cell into a table according to an embodiment of the present disclosure.

Referring to FIGS. 5A and 5B, when one of a plurality of cells is selected on the table, the controller 290 may control the display 220 to display an insertion icon in at least one of the up and down and left and right directions of the selected cell. For example, as illustrated in FIG. 5A, when a $5^{th}$ cell 515 is highlighted in a table including 9 cells 511, 512, 513, 514, 515, 516, 517, 518, and 519, the controller 290 may control the display 220 to display four insertion icons 541, 543, 545, and 547 in the up and down and left and right directions of the selected cell. The controller 290 may also control the display 220 to display addition icon 520 on the right of the table for adding a column and addition 430 below the table for adding a row. However, displaying the four insertion icons 541, 543, 545, and 547 in the up and down and left and right directions of the selected cell is merely an example. Two or three insertion icons may be displayed in the up and down and left and right directions of the selected cell. According to various embodiments of the present disclosure, a combination of any of the insertion icons 541, 543, 545, and 547 may be displayed when a cell is highlighted. As an example, the combination of insertion icons 541, 543, 545, and 547 may be configured by a user as a user preference or by a manufacturer. For example, when an $8^{th}$ cell 518 is highlighted, the controller 290 may control the display 220 to display three insertion icons in the up, right, and left directions of the $8^{th}$ cell 518. In other words, the controller 290 may generate the insertion icons in order not to overlap the addition icons displayed around the table.

When one of the at least one insertion icons is selected, the controller 290 may insert a row or a column in the direction corresponding to the selected insertion icon on the basis of the selected cell. For example, as illustrated in FIGS. 5A and 5B, when the four insertion icons 541, 543, 545, and 547 are displayed around the $5^{th}$ cell 515 and the insertion icon 545 below the $5^{th}$ cell 515 is selected, the controller 290 may control the display 220 to add a new row below the highlighted $5^{th}$ cell 515 and display three new cells 551, 553, and 555. At this time, the controller 290 may control the display 220 to move the highlight down and highlight the $11^{th}$ cell 553 among the three new cells 551, 553, and 555, and display four insertion icons 541, 543, 545, and 547 in the up and down and left and right direction of the $11^{th}$ cell 553.

In the above example, the insertion icon 545 below the $5^{th}$ cell 515 is selected. However, various embodiments of the present disclosure are not limited thereto. For example, various embodiments of the present disclosure may be applied even when an insertion icon above the $5^{th}$ cell 515 or on the right or left of the $5^{th}$ cell 515 is selected. For example, when the four insertion icons 541, 543, 545, and 547 are displayed around the $5^{th}$ cell 515 and the insertion icon 547 on the right of the $5^{th}$ cell 515 is selected, the controller 290 may control the display 220 to add a new column to the right of the highlighted $5^{th}$ cell 515 and display three new cells.

FIGS. 6A, 6B, 6C, 6D, and 6E illustrate a method for deleting a cell from a table according to an embodiment of the present disclosure.

Figure 6A:
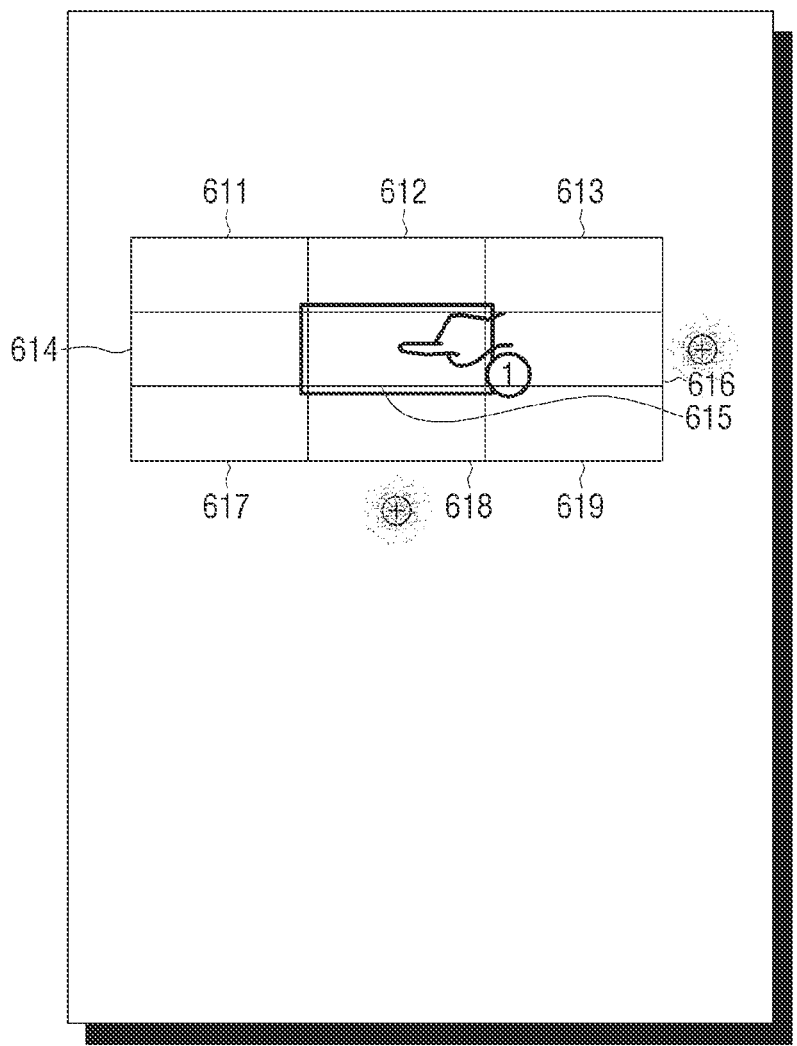
FIGS. 6A, 6B, 6C, 6D, and 6E illustrate a method for deleting a cell from a table according to an embodiment of the present disclosure.
Figure 6B:
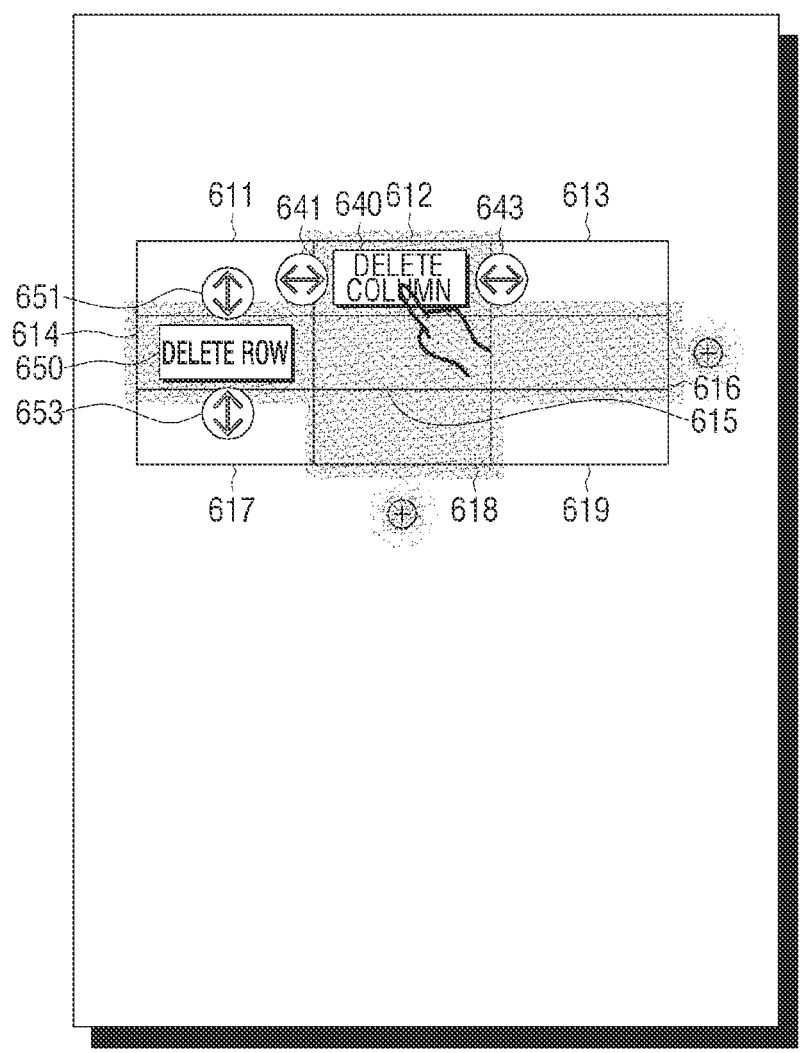

Referring to FIGS. 6A, 6B, 6C, 6D, and 6E, when a predetermined user command is input to one of a plurality of cells in a table, the controller 290 may control the display 220 to display a deletion icon in at least one of the up and down and left and right directions of the cell to which the predetermined user command is input. For example, as illustrated in FIGS. 6A and 6B, when a user inputs a touch to a $5^{th}$ cell 615 for a predetermined period of time is input to a table including 9 cells 611, 612, 613, 614, 615, 616, 617, 618, and 619, the controller 290 may control the display 220 to display a row and a column including the $5^{th}$ cell 615 differently from other rows and columns and to display deletion icons 640 and 650 above the $5^{th}$ cell 615 and on the left of the $5^{th}$ cell 615.

Figure 6C:
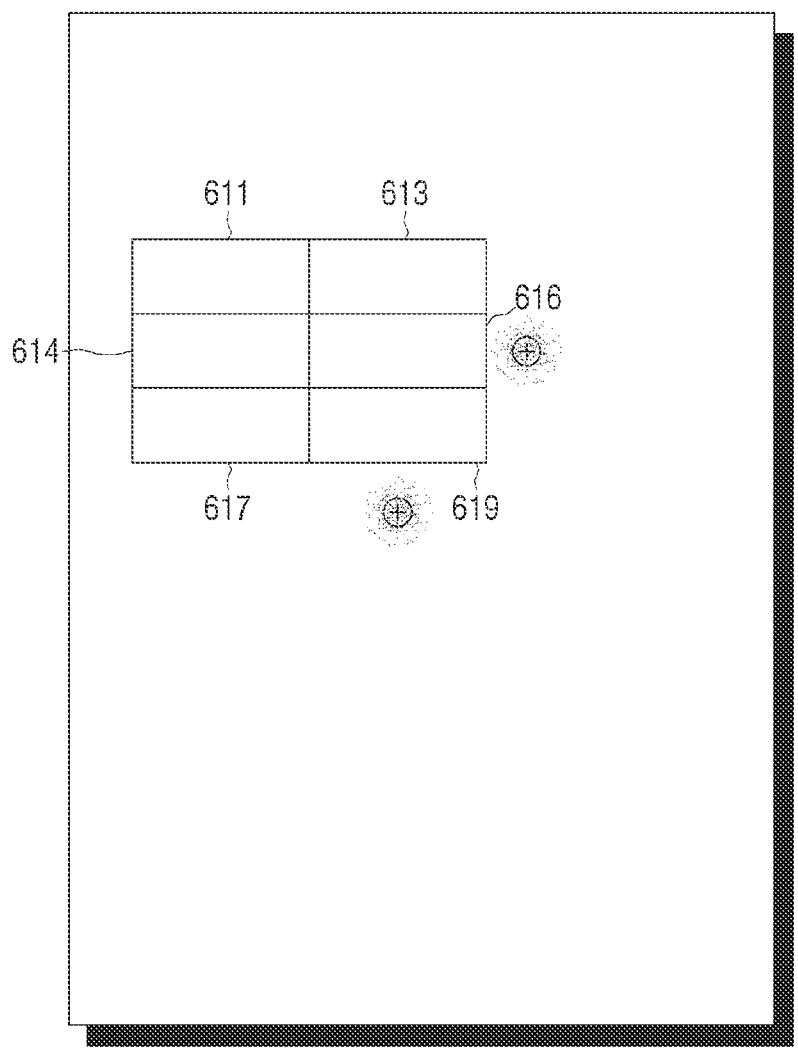

When one of the at least one deletion icons is selected, the controller 290 may delete a row or a column in the direction corresponding to the selected deletion icon on the basis of the cell to which the predetermined user command is input. For example, as illustrated in FIGS. 6B and 6C, when the deletion icons 640 and 650 are displayed above the $5^{th}$ cell 615, to which the predetermined user command is input, and on the left of the $5^{th}$ cell 615, and the column deletion icon 640 is selected, the controller 290 may delete the $2^{nd}$ cell 612, $5^{th}$ cell 615, and $8^{th}$ cell 618 to delete a column including the $5^{th}$ cell 615. As another example, when the deletion icons 640 and 650 are displayed above the $5^{th}$ cell 615, to which the predetermined user command is input, and on the left of the $5^{th}$ cell 615 as illustrated in FIG. 6B, and the row deletion icon 650 is selected, the controller 290 may delete the $4^{th}$ cell 614, $5^{th}$ cell 615, and $6^{th}$ cell 616 to delete a row including the $5^{th}$ cell 615.

Figure 6D:
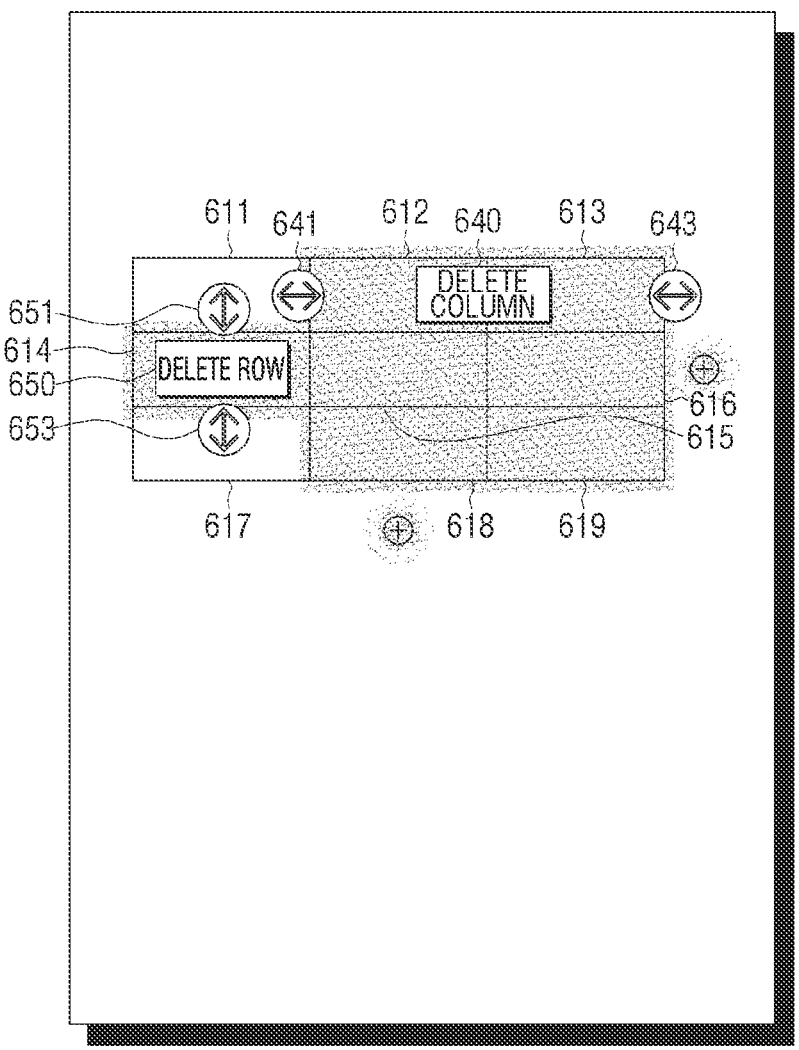
Figure 6E:
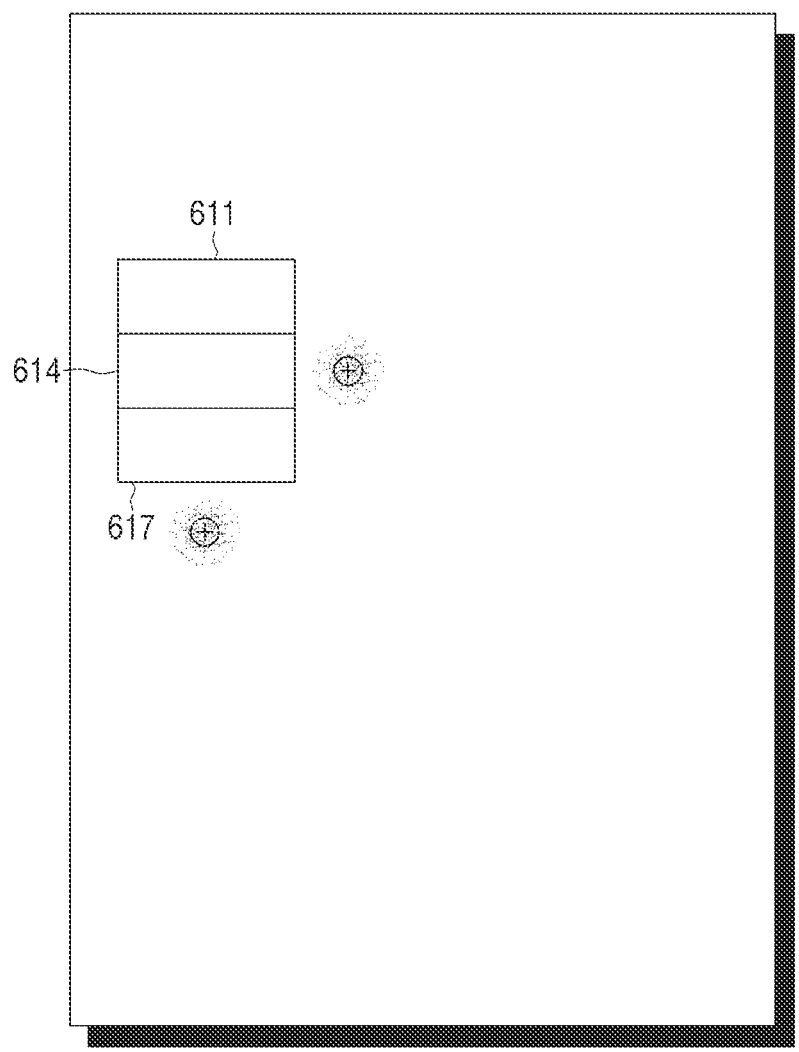

As illustrated in FIG. 6B, the controller 290 may control the display 220 to display drag icons 641, 643, 651, and 653 around the deletion icons 640 and 650 to set a deletion range. When one of the at least one deletion icon is selected after a deletion range is set using a drag icon, the controller 290 may delete a plurality of rows or columns included in the deletion range on the basis of the cell to which the predetermined user command is input. For example, as illustrated in FIGS. 6B, 6D, and 6E, in the state in which the deletion icons 640 and 650 and the four drag icons 641, 643, 651, and 653 are displayed above the $5^{th}$ cell 615 and on the left of the $5^{th}$ cell 615, to which the predetermined user command is input, when a user command to touch the second drag icon 643 and drag the second drag icon 643 to the right is input, the controller 290 may control the display 220 to display a second column including the $5^{th}$ cell 615, and a third column on the right of the second column differently from a first column. Subsequently, when the column deletion icon 640 is selected, the controller 290 may delete the cells 612, 613, 615, 616, 618, and 619 of the second and third columns.

According to various embodiments of the present disclosure, a text box is converted into a table using an addition icon displayed around the text box, and a table is edited using an addition icon, an insertion icon, a deletion icon, or a drag icon displayed around the table so that the user can convert the text box into the table and edit the table easily and conveniently. In particular, when icons around a text box or a table are used as described above when creating a document on a touch panel, the user's manipulations may be remarkably reduced in comparison with methods for creating and editing a table using a cursor according to the related art.

In addition, a text box is directly converted into a table. Accordingly, when figures are input in the cells of the table, the electronic apparatus 200 may provide arithmetic function for the figures in the cells. Furthermore, when a unit such as currency, date, time, percentage, fraction, and index is input in the cells, the electronic apparatus 200 may not recognize the indicator as general text, but as an input unit.

Figure 7:
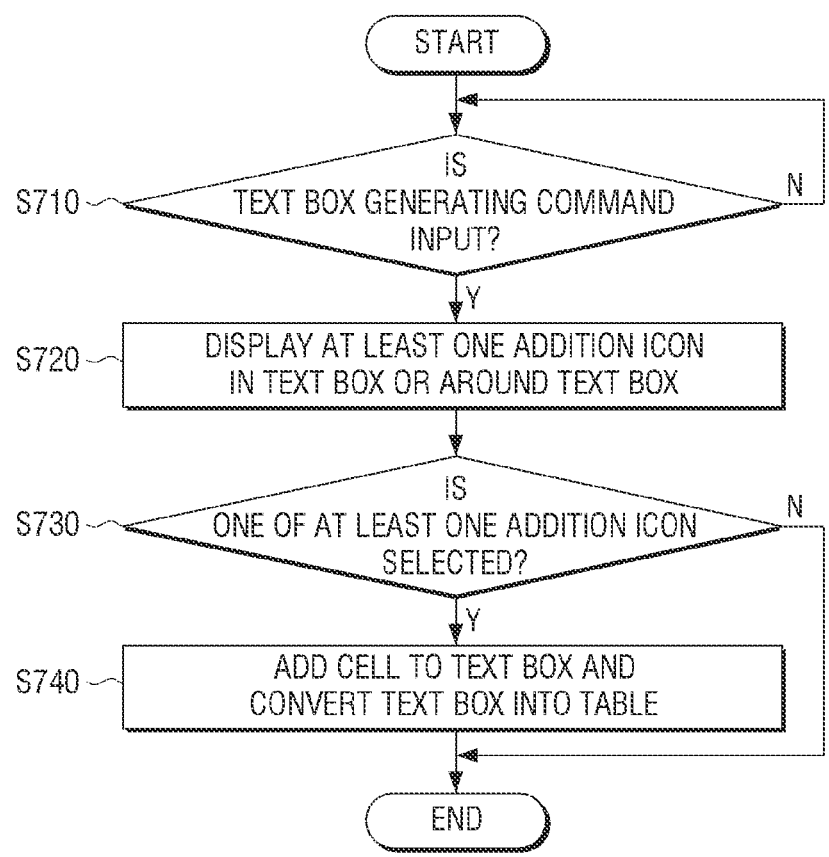
FIGS. 7 and 8 are flowcharts illustrating a method for creating a document using an electronic apparatus according to various embodiments of the present disclosure.
Figure 8:
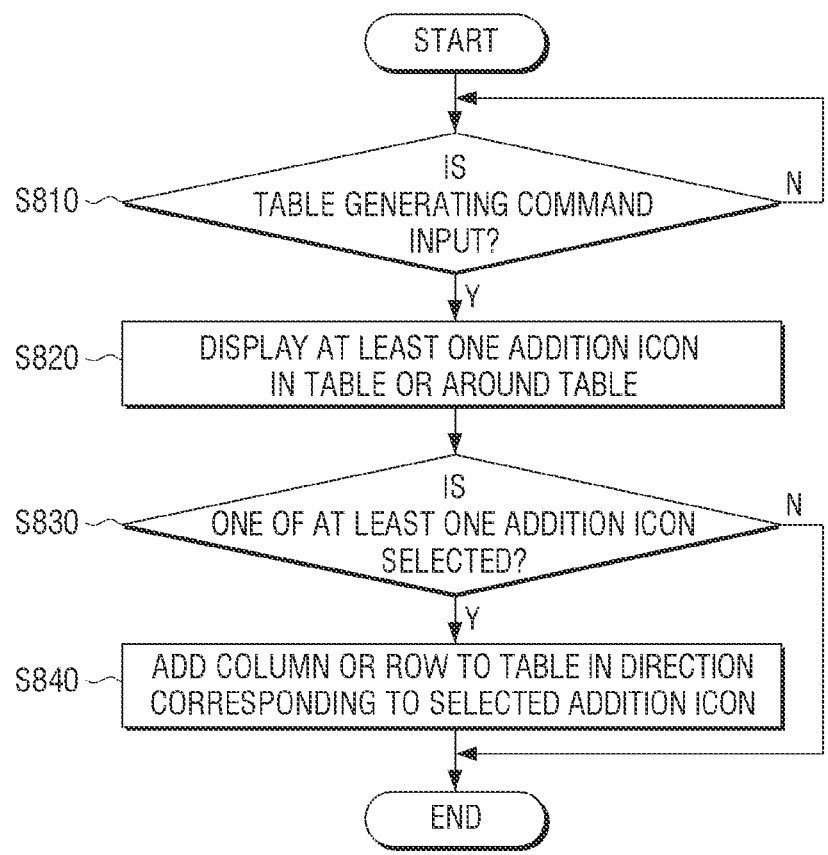

FIGS. 7 and 8 are flowcharts illustrating a method for creating a document using an electronic apparatus according to various embodiments of the present disclosure.

Referring to FIG. 7, a flowchart illustrating a method for creating a document using an electronic apparatus in order to convert a text box into a table is provided.

At operation S710, the electronic apparatus 100 determines whether a text box generating command is input. For example, when creating a document using a word processing program, the electronic apparatus 100 may determine whether an icon to generate a text box is selected.

If the electronic apparatus 100 determines that the text box generating command is not input at operation S710, then the electronic apparatus 100 may continue to poll for input of the text box generating command.

In contrast, if the electronic apparatus 100 determines that the text box generating command is input at operation S710, then the electronic apparatus 100 proceeds to operation S720 at which the electronic apparatus 100 displays at least one addition icon in the text box or around the text box. More specifically, when the text box generating command is input, the electronic apparatus 100 may display a text box 310 consisting of a single cell and display two addition icons 320 and 330 to the right of the text box 310 and below the text box 310 as shown in FIG. 3A.

At operation S730, the electronic apparatus 100 determines whether one of the at least one addition icon is selected.

If the electronic apparatus 10 determines that one of the at least one addition icon is selected in operation S730, then the electronic apparatus 100 may proceed to operation S740 at which the electronic apparatus 100 adds a cell to the text box 310 and converts the text box 310 and the cell into a table. For example, when the text box 310 and the two addition icons 320 and 330 are displayed and the addition icon 320 on the right is selected as shown in FIG. 3A, the electronic apparatus 100 may add a cell 315 in the direction corresponding to the selected addition icon 320 and convert the text box 310 and the cell 315 into a table. At this time, the electronic apparatus 100 may not only add the cell 315 to the text box 310 but may also change properties of the text box into properties of a table. Accordingly, when figures are input to the cells of the table, the electronic apparatus 100 may provide arithmetic function for the figures included in the cells.

In contrast, if the electronic apparatus 100 determines that at least one addition icon is not selected at operation S730, then the electronic apparatus 100 may end the process.

Referring to FIG. 8, a flowchart illustrating a method for creating a document using an electronic apparatus in order to edit a table is provided.

At operation S810, the electronic apparatus 100 determines whether a table generating command is input. For example, when creating a document using a word processing program, the electronic apparatus 100 may determine whether an icon to generate a table is selected. Alternatively, the electronic apparatus 100 may convert a text box into a table as shown in FIG. 7.

If the electronic apparatus 100 determines that the table generating command is not input at operation S810, then the electronic apparatus 100 may continue to poll for input of the table generating command.

In contrast, if the electronic apparatus 100 determines that the table generating command is input in operation S810, then the electronic apparatus 100 proceeds to operation S820 at which the electronic apparatus 100 displays at least one addition icon in the table or around the table. More specifically, the electronic apparatus 100 may display a table including a plurality of cells and display two addition icons on the right of the table and below the table as shown in FIG. 4A.

At operation S830, the electronic apparatus 100 determines whether one of the at least one addition icon is selected.

If the electronic apparatus 100 determines that one of the at least one addition icon is selected in operation S830, then the electronic apparatus proceeds to operation S840 at which the electronic apparatus 100 adds a cell to the text box and converts the text box into a table. For example, as illustrated in FIG. 4A, when the table 410 and the two addition icons 420 and 430 are displayed and the addition icon 420 on the right is selected as shown in FIG. 4A, the electronic apparatus 100 may add a column to the right of the table 410. When the addition icon 430 is selected, the electronic apparatus 100 may add a row below the table 410.

In contrast, if the electronic apparatus 100 determines that an addition icon is not selected at operation S830, then the electronic apparatus 100 may terminate the process.

According to various embodiments of the present disclosure, the user may add a column or a row to the table without generating a new menu screen.

The method for creating a document using an electronic apparatus according to the various embodiments of the present disclosure may be implemented with a program and be provided to electronic apparatuses. In addition, the program may be stored in a non-transitory computer readable medium and be provided. The non-transitory computer readable medium is a medium which does not store data temporarily such as a register, cash, and memory but stores data semi-permanently and is readable by devices. More specifically, the aforementioned applications or programs may be stored in a non-transitory computer readable medium such as a Compact Disk (CD), Digital Video Disk (DVD), hard disk, Blu-ray disk, Universal Serial Bus (USB), memory card, Read-Only Memory (ROM), and the like be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for creating a document using an electronic apparatus, the method comprising:
    displaying at least one addition visual element in or around a text box, in response to input of a text box generating command; and
    adding a cell to the text box and converting the text box into a table, in response to selection of one of the at least one addition visual element,
    wherein a number of addition visual elements displayed in or around a text box is configurable by a user,
    wherein when the table includes a plurality of rows and a plurality of columns, and one of a plurality of cells in the table is selected, displaying an addition visual element in at least one of up and down and left and right directions of the selected cell, and
    wherein insertion of an addition visual element is prevented by at least one computer processor of the electronic apparatus if the insertion of the addition visual element would duplicate functionality of an existing addition visual element based on a position of the existing addition visual element relative to the selected cell.

2. The method of claim 1, wherein the displaying of at least one addition visual element comprises:
    displaying two addition visual elements such that an addition visual element is displayed to the right of the text box and another addition visual element is displayed below the text box.

3. The method of claim 2, wherein the converting of the text box into the table comprises:

when the addition visual element displayed to the right of the text box is selected, adding the cell to the right of the text box, and converting the text box into the table, and when the addition visual element displayed below the text box is selected, adding the cell below the text box, and converting the text box into the table.

4. The method of claim 1, wherein the converting of the text box into the table comprises displaying two addition visual elements such that an addition visual element is displayed to the right of the table and another addition visual element is displayed below the table.

5. The method of claim 4, wherein when the addition visual element displayed to the right of the table is selected, a new column is added to the table, and wherein, when the addition visual element displayed below the table is selected, a new row is added to the table.

6. The method of claim 5, further comprising:

when the table includes a plurality of rows and a plurality of columns, and one of a plurality of cells in the table is selected, displaying an addition visual element in at least one of up and down and left and right directions of the selected cell; and when one of the at least one addition visual element is selected, inserting a row or a column in direction corresponding to the selected addition visual element on the basis of the selected cell.

7. The method of claim 5, further comprising:

when the table includes a plurality of rows and a plurality of columns, and a predetermined user command is input to one of a plurality of cells in the table, displaying a deletion icon in at least one of up and down and left and right directions of a cell to which the predetermined user command is input; and when one of the at least one deletion icon is selected, deleting a row or a column in direction corresponding to the selected deletion icon on the basis of a cell to which the predetermined user command is input.

8. The method of claim 7, wherein in the operation of displaying of the deletion icon comprises displaying a drag icon around the deletion icon, and wherein the deleting of the row or the column comprises, when a deletion range is set using the drag icon and one of the at least one deletion icon is selected, deleting a plurality of rows or columns included in the deletion range on the basis of a cell to which the predetermined user command is input.

9. The method of claim 1, wherein when figures are input to a plurality of cells in the table, the table provides arithmetic function for the figures in the plurality of cells.

10. The method of claim 1, wherein the electronic apparatus receives a user command through a touch screen.

11. An electronic apparatus comprising:

a display;

inputter configured to receive a user command wherein the inputter includes at least one of a touch screen and an input device, the input device comprising at least one of a mouse, a pointing device, and a motion sensor; and at least one computer processor configured to:

control the display to display at least one addition visual element in or around a text box in response to input of a text box generating command through the touch screen, and add a cell to the text box and convert the text box into a table in response to selection of one of the at least one addition visual element through the inputter, wherein a number of addition visual elements displayed in or around a text box is configurable by a user, wherein when the table includes a plurality of rows and a plurality of columns, and one of a plurality of cells in the table is selected, displaying an addition visual element in at least one of up and down and left and right directions of the selected cell, and wherein insertion of an addition visual element is prevented by the at least one computer processor if the insertion of the addition visual element would duplicate functionality of an existing addition visual element based on a position of the existing addition visual element relative to the selected cell.

12. The electronic apparatus of claim 11, wherein the at least one computer processor controls the display to display two addition visual elements such that an addition visual element is displayed to the right of the text box and another addition visual element is displayed below the text box.

13. The electronic apparatus of claim 12, wherein, when the addition visual element displayed to the right of the text box is selected, the at least one computer processor adds the cell to the right of the text box, and converts the text box into the table, and wherein, when the addition visual element displayed below the text box is selected, the at least one computer processor adds the cell below the text box, and converts the text box into the table.

14. The electronic apparatus of claim 11, wherein the at least one computer processor controls the display to display two addition visual elements such that an addition visual element is displayed to the right of the table and another addition visual element is displayed below the table.

15. The electronic apparatus of claim 14, wherein, when the addition visual element displayed to the right of the table is selected, the at least one computer processor adds a new column to the table, and wherein, when the addition visual element displayed below the table is selected, the at least one computer processor adds a new row to the table.

16. The electronic apparatus of claim 15, wherein, when the table includes a plurality of rows and a plurality of columns, and one of a plurality of cells in the table is selected, the at least one computer processor controls the display to display an addition visual element in at least one of up and down and left and right directions of the selected cell, and wherein, when one of the at least one addition visual element is selected through the touch screen, the at least one computer processor inserts a row or a column in direction corresponding to the selected addition visual element on the basis of the selected cell.

17. The electronic apparatus of claim 15, wherein, when the table includes a plurality of rows and a plurality of columns, and a predetermined user command is input to one of a plurality of cells in the table, the at least one computer processor controls the display to display a deletion icon in at least one of up and down and left and right directions of a cell to which the predetermined user command is input, and wherein, when one of the at least one deletion icon is selected, the at least one computer processor deletes a row or a column in direction corresponding to the selected deletion icon on the basis of a cell to which the predetermined user command is input.

18. The electronic apparatus of claim 17, wherein the at least one computer processor controls the display to display a drag icon around the deletion icon, and
wherein, when a deletion range is set using the drag icon and one of the at least one deletion icon is selected, the at least one computer processor deletes a plurality of rows or columns included in the deletion range on the basis of a cell to which the predetermined user command is input.

19. The electronic apparatus of claim 11, wherein, when figures are input to a plurality of cells in the table, the table provides arithmetic function for the figures in the plurality of cells.

20. A method for creating a document using an electronic apparatus, the method comprising:
displaying at least one addition visual element in or around a table in response to input of a text box generating command; and
adding a column or a row in direction corresponding to the selected addition visual element, in response to selection of one of the least one addition visual element,
wherein a number of addition visual elements displayed in or around a text box is configurable by a user, and
wherein insertion of an addition visual element is prevented by at least one computer processor of the electronic apparatus if the insertion of the addition visual element would duplicate functionality of an existing addition visual element based on a position of the existing addition visual element relative to the selected cell.

21. An electronic apparatus comprising:
a display;
a touch screen configured to receive a user command; and
at least one computer processor configured to:
control the display to display at least one addition visual element in or around a table in response to input of a table generating command through the touch screen, and
add a column or a row in direction corresponding to a selected addition visual element in response to selection of one of the at least one addition visual element through the touch screen,
wherein a number of addition visual elements displayed in or around a text box is configurable by a user, and
wherein insertion of an addition visual element is prevented by at least one computer processor of the electronic apparatus if the insertion of the addition visual element would duplicate functionality of an existing addition visual element based on a position of the existing addition visual element relative to the selected cell.

* * * * *